Dec. 24, 1968     PER-ALLAN LJUNGBERG     3,417,545
APPARATUS FOR DETACHING FILLED AND SEALED
PACKAGES FROM A PACKAGE BLANK

Filed Feb. 3, 1966     2 Sheets-Sheet 1

INVENTOR
PER-ALLAN LJUNGBERG
BY

*Earle R. Marsden*
ATTORNEY

Dec. 24, 1968 PER-ALLAN LJUNGBERG 3,417,545
APPARATUS FOR DETACHING FILLED AND SEALED
PACKAGES FROM A PACKAGE BLANK
Filed Feb. 3, 1966 2 Sheets-Sheet 2
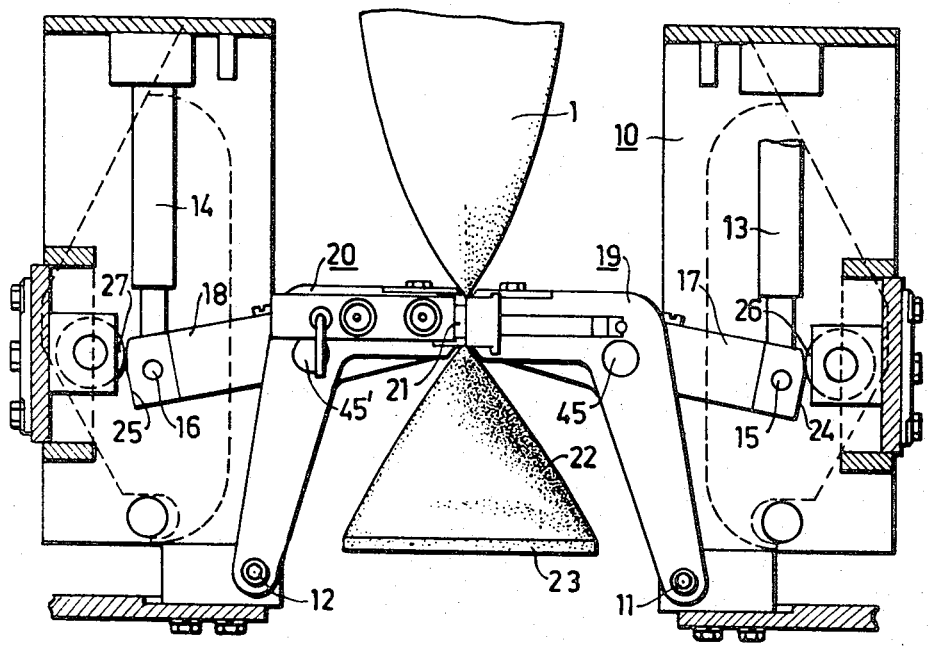
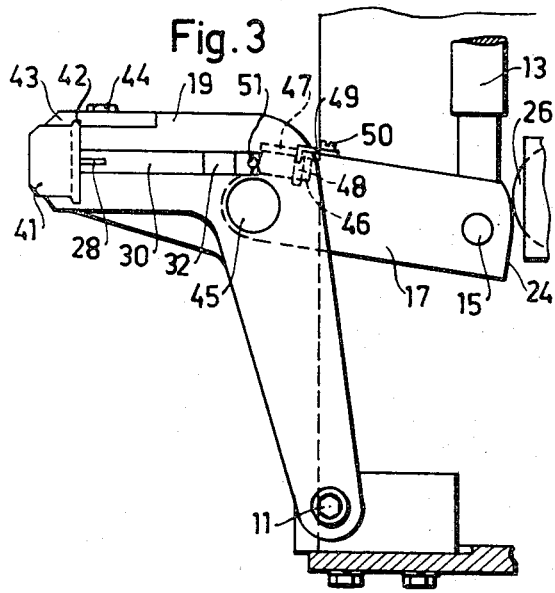
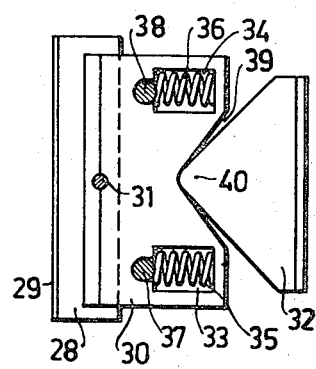
INVENTOR
PER-ALLAN LJUNGBERG
BY
ATTORNEY

United States Patent Office 3,417,545
Patented Dec. 24, 1968

3,417,545
APPARATUS FOR DETACHING FILLED AND SEALED PACKAGES FROM A PACKAGE BLANK
Per-Allan Ljungberg, Lund, Sweden, assignor to AB Tetra Pak, Lund, Sweden, a Swedish company
Filed Feb. 3, 1966, Ser. No. 524,786
Claims priority, application Switzerland, Feb. 5, 1965, 1,591/65
3 Claims. (Cl. 53—182)

ABSTRACT OF THE DISCLOSURE

Apparatus to sever flat pressed and sealed filled packages from a package blank which includes a pair of sealing jaws, one of which has a cutting blade therein which severs the package blank and projects into a notch in the other when the jaws are brought together.

---

Figure 1:
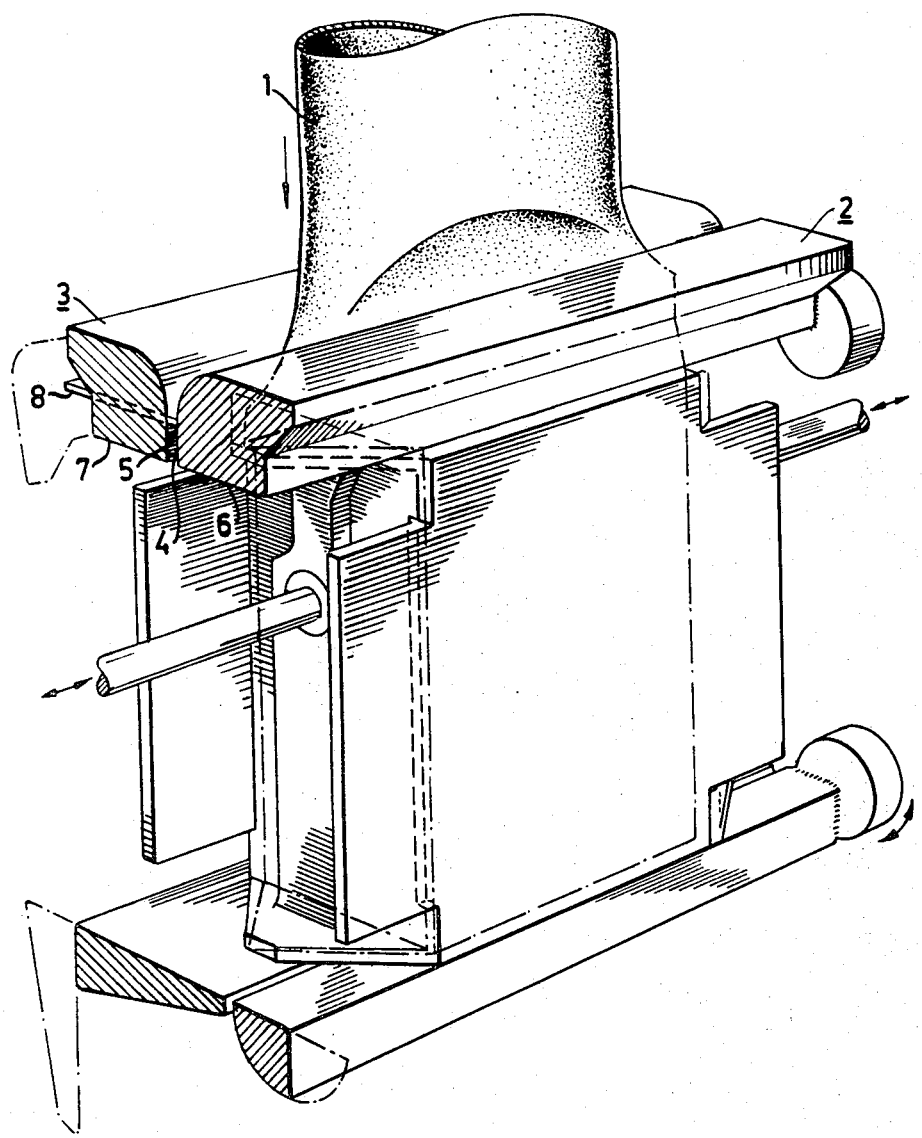

The present invention refers to the packaging art and is directed to apparatus for detaching filled and sealed packages from a package blank. In this apparatus a tubular package blank consisting of a packaging material is flat-pressed and sealed by means of cooperating sealing jaws in relatively narrow zones transverse to the tube axis and spaced along the latter so as to be subdivided into sealed units which contain a quantity of filling material supplied through the interior of the tube and before the sealing of the units. The apparatus is characterized by the fact that the units are detached from the tube by cuts in the transverse sealing zones, said cuts being made by a knife provided in one of the jaws by moving this knife towards the other jaws, when said jaws still are in the position occupied for flat-pressing and sealing the tube.

It has been well known for a long time to manufacture packages by forming a web-shaped packaging material into a tube, filling the tube with filling material up to a predetermined level, and subdividing said tube into individual package units by pressing together and sealing the tube walls. The packaging material is a relatively rigid paper material having a thermoplastic layer at least on the side which is to form the inner side of the finished package. Packaging material consisting of homogeneous thermoplastic material are also known.

The thermoplastic layer performs two functions. First, it gives the package the tightness required for packaging for example liquid substance and, second, it forms an adresive agent in sealing the tube. Transverse seals are produced by pressing together the tube walls by means of two sealing jaws, a heating jaw and a counter-jaw which are pressed against each other. By supplying heat to the heating jaw the thermoplastic is softened on the inner side and thereby stuck together and after the ceasing of the supply of heat again solidified, whereby a good seal is provided.

In this way a number of filled and sealed units connected together by transverse sealing zones have been obtained. The next step will therefore be to detach the packages from each other by cuts in the transverse sealing zones. This has been performed by special detaching means, operating in synchronisation with the sealing jaws.

Owing to stretching of the packaging material, among other things it has involved very great difficulties to control the cutting means so that the cut takes place exactly at the center of the transverse sealing zone. Therefore, a considerable part of the sealing zones has to form safety margins for the cutting operation. It is apparent that this method causes an appreciable waste of expensive packaging material. An object of the present invention, therefore, is to obviate this waste by instead detaching the units from the tube by cuts in the transverse sealing zones, said cuts being carried out by a knife provided in one of the jaws by moving this knife toward the other jaw, when said jaws still are in the position occupied for flat-pressing and sealing the tube.

The invention also refers to a device for carrying out the method, characterized by two cooperating sealing jaws, one consisting of a heating jaw and the other of a counter-jaw, a cutting member movable relatively to the jaws and housed in one of said jaws, and a notch or recess in this jaw adapted to receive said cutting member.

Further characteristics of the invention will appear from the following examples thereof which will be described with reference to the accompanying diagrammatic drawings, in which:

FIGURE 1 shows a knife according to the invention applied to a sealing member;
FIGURE 2 shows sealing and detaching members according to another embodiment;
FIGURE 3 more particularly shows a counter-jaw according to this embodiment provided with cutting members; and
FIGURE 4 shows details of the jaw according to FIGURE 3.

Referring to the drawings, FIGURE 1 shows sealing and forming members for producing substantially parallelepipedic packages. The packaging machine incorporating the members illustrated is assumed to be of the well known type which produces a depending—here vertical—tube 1 having a relatively stiff or deformation resistant but flexible wall. As it is being produced the tube 1 is fed downward between two stationary cooperating sealing jaws 2 and 3. The tube 1 has a heat sealing inner side and the jaws 2 and 3 are adapted to press the tube 1 flat in relatively narrow zones transverse to the tube axis and spaced along the latter, and to supply heat to the inner side of these zones, so that the tube 1 is subdivided into sealed units.

From the upper end of the tube 1 a liquid filling material is introduced into the interior thereof in such a way that at any occasion of making a transverse sealing zone, a column of filling material is subdivided within the tube 1. This in turn implies that the sealed units into which the tube 1 is subdivided are wholly filled with the filling material. Packaging machines are also known which operate with tube-shaped package blanks in which the level of filling material is at a relatively low level, so that the sealed units into which the tube is subdivided are not completely filled with the filling material but will also contain a certain quantity of gas, e.g., air.

While the packaging machine, in respect of the known part thereof as hitherto described, only has a stationary couple of cooperating transverse sealing jaws actually operative in forming packages, in the embodiment of the machine diagrammatically shown in FIGURE 1, it includes a package forming means comprising the stationary pair of transverse sealing jaws 2, 3 as part thereof only. However, since the remaining parts of said package forming means is of limited interest only in connection with the present invention, which refers to methods and devices for detaching packages, further details of these parts will not be described here.

The jaws 2 and 3 are formed as two flaps which are mounted to pivot about two parallel horizontal axes on both sides of the vertical path of tube feeding into a position shown in FIGURE 1 in which the two cooperating pinching surfaces 4 and 5, respecively, occupy their operative transverse sealing position substantially in an axial plane in relation to the tube 1, while they have two subsantially flat surfaces 6 and 7, respectively, facing downward, which in this position are substantially contained in one and the same horizontal plane.

In FIGURE 1 one of the two upper flaps, viz., the flap 3, has been shown provided with tube cut-off means which includes a knife 8 slidable in the flap 3 and adapted, with the flaps 2 and 3 in the sealing position, to be projected from the pinching surface 4 of the flap 2 as a back-up, to cut off the tube 1 in the sealing zone defined by the pinching surfaces 4 and 5.

When the tube 1, after completion of the forming process, has been cut off by means of the knife 8, the flaps 2, 3 are withdrawn and the remaining forming members shown in FIGURE 1 are returned to their respective inoperative positions. The completely filled and sealed unit detached from the tube 1 is then discharged in a finished condition from the forming means, whereupon the latter may repeat the forming and detaching process just described in respect of another length of tube.

In FIGURE 1 it has not been particularly shown how the means operating the knife 8 are to be constructed. While obviously a number of different solutions of this problem may be conceived, a cutting device will be illustrated in detail in the following in connection with another form of the sealing jaws.

According to the embodiment the principle of which will be understood from FIGURE 2, the sealing jaws 19 and 20 are carried by a movable frame 10. The packaging machine comprising said frame as a part thereof is intended for producing tetrahedral packages in particular, having transverse sealing zones which enclose an angle, usually 90°, between them. For this reason the packaging machine includes two frames 10, disposed at an angle in relation to each other, each containing two sealing jaws 19 and 20. Only one frame is shown in the figure. The sealing jaws 19, 20 are mounted in said frame 10 by pivots 11 and 12, whereby the jaws will be carried along in the movements of the frame. Furthermore, the jaws are movable in response to operating rods 13 and 14, respectively, which are attached by pivots 15 and 16, respectively, to links 17 and 18, respectively. The jaw 20, which will hereinafter be referred to as the heating jaw, is provided with a heating strip 21 which is heated by means of electric current. Normally, the heating strip has two narrow zones in which the sealing operation in carried out. The heating strip is fixed to an electrically insulating ceramic material, and the cutting operation may be effected, according to the invention, against this ceramic material in the regioin between the two zones. The jaw 19 functions at the sealing operation as a back-up means for the heating strip and is therefore referred to as a counter-jaw. Besides this, the counter-jaw 19 is provided with cutting members, the construction of which will be disclosed in the following. The arrangements function largely in the following manner.

From the upper end of the tube 1 a filling material is introduced into the interior thereof in such a manner that at any transverse sealing occasion the level of filling material is above the transverse sealing zone in question. Usually the filling material consists of a liquid but powdered as well as more solid substances may also be packed in this way. In the position shown in FIGURE 2 a package unit 22 has been partitioned off from the tube 1 by means of the sealing jaws 19 and 20. At the bottom part of the tetrahedral package 22 which has not yet been separated from the tube 1 it has transverse sealing zone 23 which has been produced by the said angularly disposed pair of jaws, not shown. After, or while performing the sealing, the partitioned-off package 22 is separated from the tube 1 by means of said cutting members provided in the counter-jaw 19. Under all circumstances, the jaws do not leave the position shown in FIGURE 2 before the separation is completed.

After thus closing the package 22 by said heat sealing process and cutting it off from the tube 1 by a cut in the upper sealing zone, the pressure of the jaws is released by moving the operating rods 13 and 14 downward. The finished package 22 then drops into a take-up basket arranged in any suitable way.

When the operating rods 13 and 14 have been moved downward so far that the jaws 19 and 20 have reached their rest positions, another operation may be initiated. This is performed by the other pair of jaws, disposed at an angle in relation to the pair of jaws according to FIGURE 2. However, since the modes of operation of the pairs of jaws are identical, the operation will be described with reference to the pair of jaws shown in FIGURE 2.

A new operation is initiated by moving the frame 10 upward a distance corresponding to the distance between two adjacent transverse sealing zones. Thereupon, the operating rods 13 and 14 are moved upward, whereby the jaws 19 and 20 move toward each other while compressing the tube 1 in the contemplated transverse sealing region. The sealing is carried out by supplying power to the heating strip 21. The links 17 and 18 are provided with guiding surfaces 24 and 25, respectively, which in the last phase of the upward movements of the operating rods 13 and 14 cooperate with rollers 26 and 27 mounted in the frame 10. Thereby the links 17 and 18 are forced to rotate about joints 45 and 45′, respectively, the link 17 operating a cutting member provided in the counter-jaw 19, so that this is moved with some force against the packaging material disposed between the jaws to cut it off, while the link 18 presses the heating jaw with a corresponding force against the cutting member. The heating strip 21 will accordingly serve as a backup means opposing the cutting member.

How the counter-jaw and the separating members mounted therein are to be constructed in one embodiment of the invention will now be described with reference to FIGURES 3 and 4.

The cutting member consists of a knife 28 having a cutting edge 29. The knife is secured by means of a screw or bolt 31 in a notch in a knife holder 30. Furthermore, a force transmitting member compensting for non-symmetrical forces is provided in the form of a cradle 32. The holder 30 has two holes 33 and 34 provided therein in which springs 35 and 36, respectively, are disposed. In addition, where the holder is mounted in the jaw 19, two through bolts 37 and 38 secured in the jaw pass through the holes 33 and 34. The holder 30 has an angular recess 39, the angle being slightly greater than a corresponding angular part 40 of the cradle 32. The differential angle is exaggerated in FIGURE 4, for the sake of clearness, and actually amounts to a few degrees.

The knife 28, the holder 30 and the cradle 32 are retained in the jaw by a bar 41 which besides functions as a counter-surface at the heat sealing. In this surface there is a notch, not visible in the figure, having an extension corresponding to a cross-section of the knife in the longitudinal direction thereof. The cover 41 is provided with a flange 42 and is held in the position shown in FIGURE 3 by a part 43 which is in turn secured in the jaw 19 by a screw 44.

As already mentioned, the link 17 is provided with a guiding surface 24 at the end thereof remote from the jaw 19. At its other end it is secured to the jaw through a joint 45. The purpose of the link 17 is to move the counter-jaw 19 towards the heating jaw. This is effected by the link 17 heavily pressing against the cradle 32, considerable forces being developed thereby. To take these forces, a hard metal pin 51 has been provided in the cradle, at the end turned toward the link 17. In the link there is provided a boring 46 in which there is disposed a hard metal piece 47 shaped to conform to the boring. Communicating with the boring 46 the link 17 has recess 48 in which said hard metal piece 47 is retained by a sheet metal member 49. For this purpose a notch is also made in the hard metal piece. The retaining member is screwed tight on to the body of the link by the screw 50.

The separating members function in the following way. The separating process is assumed to begin when the jaws occupy their operative final deformation position shown in FIGURE 2. The jaws 19 and 20 have been turned about the joints 11 and 12, respectively, from their rest positions toward each other because of the upward movements of the operating rods 13 and 14. With regard to the link 17, it has then, through its hard metal piece 47, engaged the hard metal pin 51 of the cradle. However, the cradle and thereby also the knife has been retained in its rest position owing to the strong springs 35 and 36. When the guiding surface 24 of the link 17 contacts the roll 26, the jaws have substantially reached the end of the tube deformation position and, consequently, cannot move further towards each other. However, the operating rod is forced further upwards, whereby a heavy pressure arises between the guiding surface 24 and the roll 26 so that the link 17 is turned about the joint 45. Hereby an appreciable force arises between the two hard metal members 47 and 51. The cradle 32 transmits this force to the knife holder 30. The force is so great that the two springs 35 and 36 are compressed against the through bolts 37 and 38, respectively. Thus, the knife is moved, opposed by said springs, towards the sealing spot and detaches the finished package from the tube. When the operating rod 13 is returned downward after completed cutting-off operation, the cutting member 28 is returned to its rest position by the compressed springs 35 and 36.

To obtain efficient cutting-off of the packaging material it is a condition that the edge 29 of the knife 28 at all points of the intersection line shall be pressed with a sufficiently great force against the packaging material. If for some reason a small amount of unsymmetry arises, so that the knife is pressed heavily against the packaging material at one end thereof only, efficient cutting will take place at this end only but not at the other. By the form of the holder 30 and the cradle 32 these undesirable unsymmetries may be compensated. By the fact that the angular portion 40 of the cradle 32 forms an angle which is slightly more acute than the angle of the corresponding recess 39 in the holder 30, the latter will spontaneously adjust itself in response to the counter-action at the compression, i.e., to the position of the heating strip 21.

It is obvious that the invention is not limited to the embodiments shown. Thus, other sealing jaws than those described may also be provided with cutting devices according to the invention. Furthermore, the cutting device may also be modified in various ways as may also the operating means, and therefore the invention is limited only by the following claims.

That which is claimed is:

1. Apparatus to detach filled packages from a package blank comprising: a pair of sealing jaws, means mounting said jaws in opposed relation to one another, means to urge said jaws toward one another to flat press a tubular package therebetween, heating means in one of said jaws to heat seal a tubular package flat pressed therebetween, and cutting means in the other of said jaws, said cutting means including compensating means for unsymmetric components of force during the cutting operation, said compensating means including a cradle having an obtuse rounded angle in the plane of the cutting means with the apex of the obtuse angle directed toward the heating jaw and a support member for said cutting means having a substantially triangular recess therein to accommodate said obtuse angle portion of said cradle, said triangular recess having a slightly greater angle than said obtuse angle.

2. The structure of claim 1 wherein said cutting means also includes a knife member with a straight edge long enough to sever the entire length of a tubular package flat pressed between said jaws.

3. The structure of claim 2 wherein a notch is provided in the other of said jaws, said cutting means being movable relative to said jaws.

References Cited

UNITED STATES PATENTS 3,325,961   6/1967   Lindh et al. _____ 53—28

FOREIGN PATENTS 1,366,344   6/1964   France.

TRAVIS S. McGEHEE, *Primary Examiner.*

N. ABRAMS, *Assistant Examiner.*